Dec. 5, 1961  M. E. BLACKBURN  3,011,642
METHOD AND APPARATUS FOR TREATING OIL IN
OIL-IMMERSED INDUCTION APPARATUS
Filed Aug. 6, 1957  2 Sheets-Sheet 1

INVENTOR.
MILTON E. BLACKBURN
BY Jugelter & Jugelter
ATTORNEYS

Dec. 5, 1961 M. E. BLACKBURN 3,011,642
METHOD AND APPARATUS FOR TREATING OIL IN
OIL-IMMERSED INDUCTION APPARATUS
Filed Aug. 6, 1957 2 Sheets-Sheet 2

INVENTOR.
MILTON E. BLACKBURN
BY *Jugelter & Jugelter*

ATTORNEYS

United States Patent Office 3,011,642
Patented Dec. 5, 1961

3,011,642
METHOD AND APPARATUS FOR TREATING OIL IN OIL-IMMERSED INDUCTION APPARATUS
Milton E. Blackburn, 3996 S. Whetsel Fairfax, Cincinnati, Ohio
Filed Aug. 6, 1957, Ser. No. 676,674
2 Claims. (Cl. 210—128)

This invention relates to an apparatus for treating oil, such as a transformer oil servicing device, or for any other liquid which is required to be kept purified for the most efficient use thereof, such as that used for insulating oil in oil-immersed induction apparatus.

One object of this invention is to make automatic the return of dielectric oil, which has not been returned to the oil transformer through the operation of the filter assembly, to the filter assembly once again for re-purification without wasting or discarding such oil.

Another object of the invention is to eliminate the regular and periodical manual operation which is necessary in the ordinary oil filter system, that demands the removal periodically of an amount of unreturned oil that has dripped through the system into a reservoir, below the filter assembly, thus reducing the cost of maintenance upon the apparatus.

The invention will be better understood from the following description taken in connection with the accompanying drawings which show an oil purifying system connected to the casing of an oil immersed transformer and equipped with purifying means including a float valve arrangement for the drip pan or reservoir of the oil filtering or purifying system, and also various constituent elements that help comprise the filtering system.

In the drawing.

In the following explanation and description of the invention, like numbers will describe the like parts.

Figure 1:
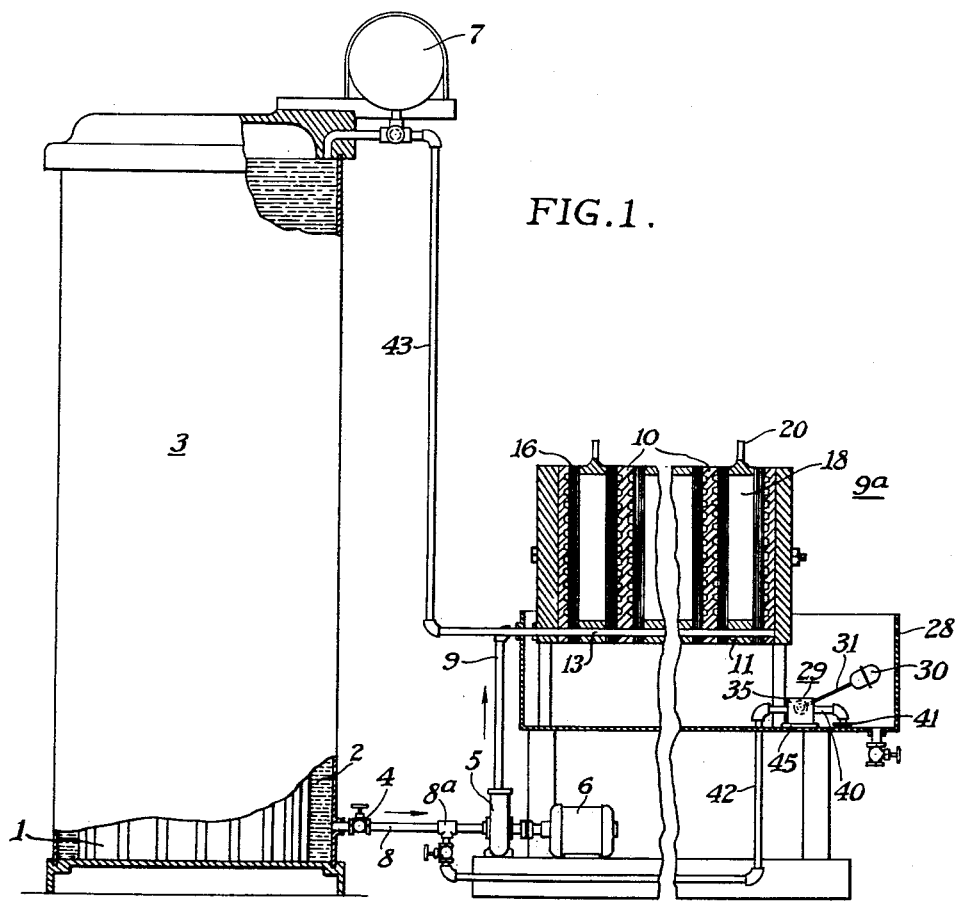
FIG. 1 is a view partly in side elevation and partly in section of an oil immersed transformer and an oil purifying system connected therewith.
Figure 2:
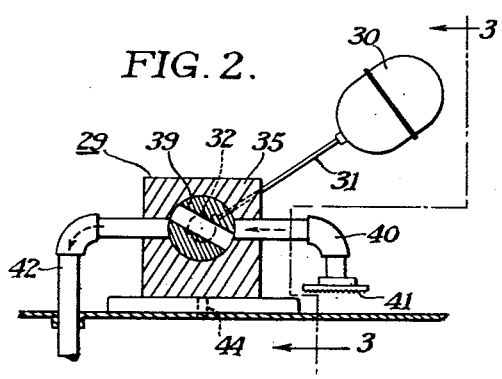
FIG. 2 is a cross-section of a float valve which forms a part of the oil purifying system with accompanying ingress and egress pipes to the rotor ports of the valve.
Figure 3:
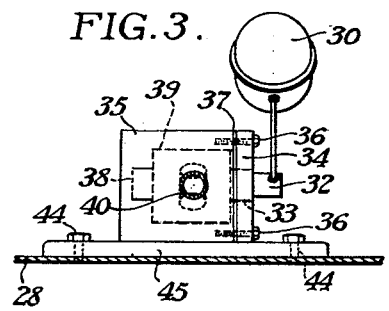
FIG. 3 is a cross-sectional view of the float valve, taken on the line 3—3 in FIG. 2.

In FIG. 1 a transformer 1 is shown immersed in a body of dielectric oil 2, all of which is enclosed in a casing 3. The oil in the transformer, after prolonged use, may partially break down and may absorb moisture which impairs the dielectric strength thereof. Periodically, the transformer requires service to eliminate moisture and products of oil break-down. It is customary to provide protection in the case of an oil immersed transformer by means of an auxiliary expansion compartment 7 which permits expansion and contraction of the oil but which constitutes a trap to prevent any air or moisture from reaching the main body of oil around the transformer. However, regardless of precaution taken, it is found that the oil in which such transformer apparatus is immersed becomes contaminated and its dielectric strength is impaired. Thus, the oil must then be purified.

At the bottom of the casing is a manual valve 4 through which contaminated oil from the transformer is drawn out by means of pump 5 run by motor 6.

When it is found desirable to purify the oil in which the transformer is immersed, the oil is pumped from casing 3, and is withdrawn through line or pipe connection 8 through pump 5 and thence through pipe 9 into an oil filtering system indicated generally at 9a.

Figure 4:
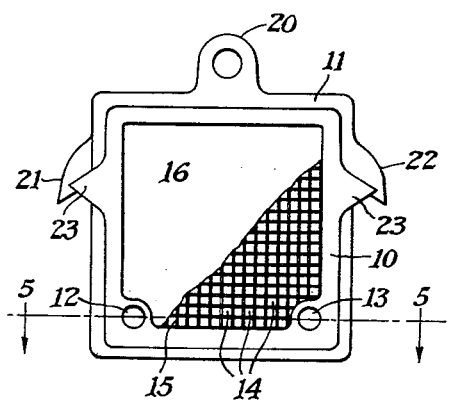
FIG. 4 is a view in side elevation showing a frame and plate of the filter assembly of the oil purifying system shown in FIG. 1 with a layer of filter paper therebetween, part of the filter paper being broken away for clarity.
Figure 5:
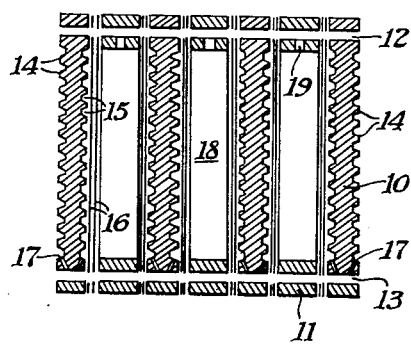
FIG. 5 shows a schematic view in section taken on the line 5—5 in FIG. 4.

The filtering system 9a, as seen in FIGS. 1, 4, and 5, is composed partly of a series of alternate cast-iron plates 10 and frames 11 to form a filter press. Each plate has an associate frame which is attached tightly thereto by suitable clamping screws (not shown). In the lower corners of each plate and each frame, as shown in FIGS. 4 and 5, passages 12 and 13 appear. These passages extend the entire length of the filter assembly and form the inlet and outlet passages for the contaminated and purified oil, respectively.

Both surfaces of the plates, except for the rim and the area around the inlet and outlet passages, are grooved vertically and horizontally, forming grooves or "pyramid" surfaces 14 which support filter paper sheets 16 on each side of the plate and yet provide channels 15 for the flow of purified oil (FIG. 5). A plurality of filter paper sheets 16 (hereafter referred to as filters) extends the length of the plates and frames between each plate and frame. As shown by FIG. 5, each sheet has holes therein positioned and coinciding with passages 12 and 13. Preferably, about three thicknesses of dry moisture absorbent paper are used and which get good results. Adjacent to passage 13 and within each plate 10 are drilled holes 17 which leads from channel 15 to passage 13. Such holes 17 carry the purified oil from channel 15 to the discharge passage 13. Each frame 11 has therein adjacent to passage 12 an opening 19 which permits the contaminated oil to enter chamber 18 and thus to be purified by passing through filters 16 to channels 15. The filter sheets are carefully dried before assembly so that they can absorb any moisture in the oil which passes therethrough.

As shown in FIG. 5, the plate, filters, and frame are consecutively joined with each other to form a filter press, forming a series of oil chambers 18, the function of which will be described hereafter in the operation of the device. A handle 20 is provided on each frame for easy insertion and removal from the filter assembly. On each side of the frame are horizontally extending members 21 and 22, as shown in FIG. 4. On each side of each plate also extending horizontally is a member 23 which assists members 21 and 22 in a manner to be described.

Each of these joined plates, filters and frames is inserted in the assembly by means of resting them upon horizontal cross-bars 24 by the use of members 21, 22 and 23. That is to say, they vertically rest due to the support of cross-bars 24 upon which members 21, 22, and 23 set. At the ends of cross-bars 24 are found a stationary head 25 and a moving head 26. When the desired number of plates, filter papers, and frames have been assembled and are mounted on cross-bars 24, they are tightly compressed by adjusting nuts 27 located at the moving head 26. Only a limited number of the plates and frames are shown, but in a preferred filter assembly there may be fifteen plates and fifteen frames.

The whole oil filter assembly is mounted over a receptacle or reservoir 28. Inasmuch as the lower edges of the filter sheets are exposed, there is a constant drip of oil into the reservoir 28 from edges of the filter sheets during operation of the filtering system 9a.

A float valve 29 is located in the reservoir 28 at one end of the reservoir. It consists of a float valve proper and a float actuator 30. The float actuator 30 is attached to one end of rod 31. In turn, rod 31 is attached to a cylindrical hub 32 which is mounted upon a bearing 33. Bearing 33 permanently seats in cover 34 which is tightly screwed to a stator housing 35 by means of bolts 36. Gasket 37 is seated between the cover and housing. The housing 35 may be formed of transparent plastic material or other suitable material and constitutes the valve stator. A bearing 38, corresponding to bearing 33, is seated in a recess of the stator, so that rotor 39 is set into the housing with a very small clearance between the bearings and the rotor, as well as between the rotor and the housing. The rotor is formed to a cylinder mounted in good bearings and with very small clearance while riding in the stator.

The input to this valve is through inlet or ingress pipe 40 connected to the ingress port of the stator at the end of which may be placed a fine strainer 41 which is spaced slightly above the bottom of the reservoir. The outlet or egress pipe 42 leading from the stator egress port is connected to a T-fitting 8a in pipe connection 8 which connects casing 3 and pump 5. Thus, the valve is sealed except for the ingress and egress ports of the stator and the minute clearance of one end of the axle to the rotor at bearing 33. The ports of rotor 39 which are at the ends of the central cylindrical bore of the rotor are in alignment with the ingress and egress ports of the stator and are never completely sealed off from both of them. As shown in FIG. 1, the valve housing 35 is positioned below the level of oil in the reservoir so that any leakage at the axle of the rotor at bearing 38 is oil. The reason for this is explained in the operation of the system which is described hereafter.

The operation of the filter assembly system is as follows: Upon opening valve 4 and the starting of motor 6, the operation of pump 5 draws the contaminated oil from the transformer casing through pipes 8 and 9 into the filter assembly by means of intake passage 12. The oil passes through chambers 18 formed by the frames and the adjacent filters 16. The oil is then forced through the filters to channels 15 along the grooves and pyramids of the plates, thus becoming purified. It then flows along the grooves in the plates to the drilled passages 17 which open into the outlet passage 13, thus being returned to the transformer through the return line or pipe 43.

However, some oil escapes between the plates and the frames from the edges of the filter paper. This escape of oil may be very substantial and, if not returned to the system, is wasted, would cause the reservoir to overflow, causing waste of oil and a mess surrounding the transformer. Thus it is desired to return this drip or seepage oil to circulation in the transformer before it can overflow. Hence, the float valve and its operation is introduced as the means to automatically salvage such oil and return it to the filter assembly. The float-operated valve is so designed as to be affected only by the float 30 and is actuated independently of vacuum or pressure, while, nevertheless, having relatively few moving parts. The rotor ports are ordinarily not completely sealed off from the ingress and egress ports of the stator. Thus, as long as pump 5 is working, a suction is created through the float valve by means of pipe or drip line 42. Oil is introduced through pipe 40 to the float valve proper due to said suction. The amount of oil introduced depends upon the position of float actuator 30 which determines the relative alignments of stator and rotor ports. When the reservoir or receptacle fills up quickly, float 30 rises, thus aligning the axes of the rotor ports more closely to the axes of the ingress and egress ports. In effect then, the rate of withdrawing the oil from the reservoir increases when the reservoir's oil level is rising until such time that the oil level decreases due to float 30 actuating the rotor, thereby more closely aligning the rotor ports with the stator ports. Such action lowers float 30, causing less axial alignment between the rotor and stator ports. In other words, the varying level of the liquid or oil in the reservoir affects the amount of oil introduced into the float valve proper since the position of the float actuator depends upon the level of the liquid or oil in the reservoir. The cycle is then completed.

Figure 6:
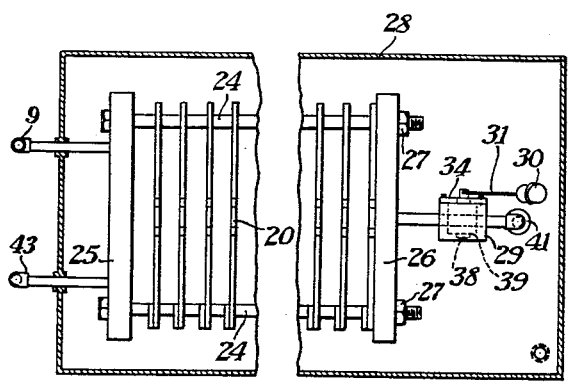
FIG. 6 is a plan view of the filter assembly and reservoir in FIG. 1 showing supporting rods for the plates, filters, and frames of the filtering system, above the reservoir, and the heads at each end of the filter assembly which comprises the plates, filters, and frames.

It should be noted that the float valve is connected to the reservoir floor by any suitable means such as bolts 44 provided for base 45 of the valve. Also, the valve may be located at one side of the reservoir as shown in FIG. 1 or 6 for easier accessibility thereto.

Thus, by the addition of a float valve to the resrevoir below the liquid filtering assembly, it is possible to return automatically otherwise wasted liquid to the assembly once again, and for return to the oil-transformer casing in such a case.

Having thus described what now appears to be a preferred form of the invention, it will be apparent to those skilled in the art, that various changes may be made in the details and arrangement of parts without departing from either the spirit or the scope of the invention.

Therefore, what I claim as new and desire to secure by Letters Patent is:

1. A filter assembly for a device requiring a circulating flow of filtered liquid therethrough, said assembly comprising a pump, a device, a filter press which leaks and is connected in series to and between said pump and said device, a receptacle below said filter press and adapted to collect liquid leakage from said filter press, a float operated valve mounted in said receptacle and adapted to open and close in response to variation of the level of liquid leakage in said receptacle from a predetermined level, a first line connected to said device, a second line connected to said valve, said first and second lines connected to said pump for delivering liquid from said device thereto, whereby operation of said pump supplies a flow of filtered liquid to said device in a closed system while reintroducing liquid leakage to said pump under regulation of said leakage.

2. A filter assembly for a transformer requiring a circulating flow of filtered liquid therethrough, said assembly comprising a pump, a transformer, a filter press which leaks and is connected in series to and between said pump and said transformer, a receptacle below said filter press and adapted to collect liquid leakage from said filter press, a float operated valve mounted in said receptacle and adapted to open and close in response to variation of the level of liquid leakage in said receptacle from a predetermined level, a first line connected to said transformer, a second line connected to said valve, said first and second lines connected to said pump for delivering liquid from said transformer thereto, whereby operation of said pump supplies a flow of filtered liquid to said transformer in a closed system while reintroducing liquid leakage to said pump under regulation of said leakage.

References Cited in the file of this patent

UNITED STATES PATENTS

| | | |
|---|---|---|
| 366,861 | Motley | July 19, 1887 |
| 787,367 | French | Apr. 18, 1905 |
| 1,830,353 | Dunbar | Nov. 3, 1931 |
| 2,073,026 | Renfrew | Mar. 9, 1937 |
| 2,136,200 | Weisser | Nov. 8, 1938 |
| 2,341,058 | Paluev | Feb. 8, 1944 |
| 2,417,958 | Teale | Mar. 25, 1947 |
| 2,451,144 | Aubrey | Oct. 12, 1948 |
| 2,673,648 | Kenney | Mar. 30, 1954 |

FOREIGN PATENTS

| | | |
|---|---|---|
| 686,837 | Germany | Jan. 17, 1940 |